United States Patent Office 3,132,145
Patented May 5, 1964

3,132,145
4-(3'-HYDROXY-4'-CARBOXY-PHENYLAMINO)-7-CHLOROQUINOLINES, AND ESTERS AND SALTS THEREOF
Andre Allais and Pierre Girault, Paris, France, assignors to Roussel-UCLAF, S.A., Paris, France, a corporation of France
No Drawing. Filed May 1, 1962, Ser. No. 191,420
Claims priority, application France May 12, 1961
8 Claims. (Cl. 260—286)

The invention relates to novel quinoline derivatives selected from the group consisting of compounds having the formula

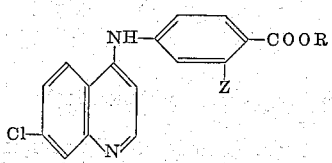
(I)

wherein Z is selected from the group consisting of hydrogen, hydroxy and an acyloxy group wherein the acyl radical is derived from a lower aliphatic carboxylic acid and R is selected from the group consisting of hydrogen, an alkali metal, an alkaline earth metal and a lower alkyl radical having 1 to 7 carbon atoms and acid addition salts thereof. The invention also relates to a novel process for the preparation of the said quinoline derivatives.

The novel quinoline derivatives of the invention possess useful pharmacodynamic properties and particularly possess an important analgesic activity. 4-(3'-hydroxy-4'-carboxy-phenylamino)-7-chloroquinoline possesses an analgesic activity superior to aspirin, for example.

It is an object of the invention to provide novel quinoline derivatives of Formula I.

It is another object of the invention to provide a novel process for the preparation of the quinoline derivatives of Formula I.

These and other objects and advantages of the invention will become obvious from the following detailed description.

The novel quinoline derivatives of the invention are selected from the group consisting of compounds having the formula

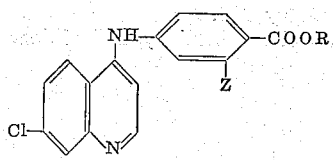
(I)

wherein Z is selected from the group consisting of hydrogen, hydroxy and an acyloxy group wherein the acyl radical is derived from a lower aliphatic carboxylic acid and R is selected from the group consisting of hydrogen, an alkali metal, an alkaline earth metal and a lower alkyl radical having 1 to 7 carbon atoms and acid addition salts thereof.

Examples of suitable acids for the acyl radical of the acyloxy groups are acetic acid, propionic acid, butyric acid, 2-methyl propionic acid, valeric acid, trimethyl acetic acid, and caproic acid.

The acid addition salts of the compounds of Formula I are non-toxic, pharmaceutically acceptable acid addition salts. Examples of suitable acids are hydrochloric acid, sulfuric acid and acetic acid.

Examples of suitable alkali metal and alkaline earth metal atoms are sodium, potassium, calcium and barium.

The process of the invention for the preparation of the compounds of Formula I comprises condensing 4,7-dichloroquinoline under acid conditions with a compound selected from the group consisting of a lower alkyl p-amino-benzoate and a lower alkyl p-amino-salicylate to form the corresponding acid addition salt of 4-(3'-Z-4'-carboalkoxy-phenylamino)-7-chloroquinoline wherein Z has the above definition and recovering a compound of Formula I.

The condensation is preferably performed in the presence of a dilute mineral acid such as hydrochloric acid but it is also possible to use an organic acid such as acetic acid. The acid salt formed is the salt of the acid used as a condensation agent and the said salt can be changed to the free base by the usual methods.

In the following examples there are described several preferred embodiments to illustrate the invention. However, it should be understood that the invention is not intended to be limited to the specific embodiments.

EXAMPLE I

*Preparation of 4-(3'-Hydroxy-4'-Carboxy-Phenylamino)-7-Chloroquinoline and Its Derivatives*

A. PREPARATION OF 4-(3'-HYDROXY-4'-CARBOMETHOXY-PHENYLAMINO)-7-CHLOROQUINOLINE 5 gm. of 4,7-dichloroquinoline and 4.2 gm. of methyl p-aminosalicylate were introduced into 100 cc. of N/2 hydrochloric acid under an atmosphere of nitrogen. The reaction mixture was heated to 100° C. (exterior temperature) while agitating for a period of 1½ hours. After cooling, the product formed was vacuum filtered, washed with water, dried and 8.5 gm. of the hydrochloride of 4-(3'-hydroxy-4'-carbomethoxy-phenylamino)-7-chloroquinoline were obtained.

The product was utilizable as such for the saponification step.

In order to obtain the corresponding free base, 5 gm. of the above product were dissolved in 150 cc. of hot dimethylformamide and 40 cc. of water were added. Then 30 cc. of dilute ammonia were added and 4-(3'-hydroxy-4'-carbomethoxy-phenylamino)-7-chloroquinoline crystallized. It was vacuum filtered, washed with water and dried giving a product having a melting point of 206° C.

The product occurred in the form of white needles, insoluble in most of the usual organic solvents as well as in water. The product was slightly soluble in hot acetone and soluble in 10 volumes of hot n-butanol.

*Analysis.*—$C_{17}H_{13}O_3N_2Cl$: Molecular weight=328.7. Calculated: C, 62.11%; H, 3.98%; N, 8.52%; Cl, 10.78%. Found: C, 62.2%; H, 4.0%; N, 8.3%; Cl, 10.7%.

This product is not described in the literature.

B. PREPARATION OF 4-(3'-ACETOXY-4'-CARBOMETHOXY-PHENYLAMINO)-7-CHLOROQUINOLINE 0.5 gm. of 4-(3'-hydroxy-4'-carbomethoxy-phenylamino)-7-chloroquinoline were introduced into 2.5 cc. of acetic anhydride. 0.240 gm. of 66° Bé. sulfuric acid were added drop by drop and the mixture was allowed to stand at room temperature for a period of 15 minutes. The product formed was vacuum filtered. It was recrystallized from dimethylformamide and 0.420 gm. of the sulfate of 4-(3'-acetoxy-4'-carbomethoxy-phenylamino)-7-chloroquinoline was obtained having a melting point of 280–285° C.

This latter product was dissolved in 6 volumes of dimethylformamide. An aqueous solution of 20% ammonia was added until the pH reached 8–9 and the solution was then iced for a period of one hour. The product was vacuum filtered, washed with ethanol and with isopropyl ether. 4-(3'-acetoxy-4'-carbomethoxy-phenylamino)-7-chloroquinoline was obtained having a melting point of 178–180° C.

The product occurred in the form of white crystals, soluble in alcohol, acetone and dimethylformamide, slightly soluble in chloroform and insoluble in benzene, ether and water.

*Analysis.*—$C_{19}H_{15}O_4N_2Cl$: Molecular weight=370.79. Calculated: C, 61.54%; H, 4.08%; N, 7.55%; Cl, 9.56%. Found: C, 61.6%; H, 4.2%; N, 7.7%; Cl, 9.7%.

This compound is not described in the literature.

C. PREPARATION OF 4-(3'-HYDROXY-4'-CARBOXY-PHENYLAMINO)-7-CHLOROQUINOLINE 10 gm. of the hydrochloride of 4-(3'-hydroxy-4'-carbomethoxy-phenylamino)-7-chloroquinoline, obtained by the preceding steps were introduced into 120 cc. of an 80% solution of ethanol. 5 gm. of potassium hydroxide were added and the mixture was heated to reflux for a period of two hours. After the addition of 20 cc. of acetic acid, the 4-(3'-hydroxy-4'-carboxy-phenylamino)-7-chloroquinoline precipitated. The product was vacuum filtered, washed by trituration with methanol and with ether, dried and 8 gm. of product having a melting point of 325–327° C. were obtained.

The product occurred in the form of yellow crystals insoluble in most of the usual organic solvents, soluble in 40 volumes of dimethylformamide.

*Analysis.*—$C_{16}H_{11}O_3N_2Cl$: Molecular weight=314.7. Calculated: C, 61.06%; H, 3.52%; N, 8.9%; Cl, 11.26%. Found: C, 60.9%; H, 3.6%; N, 9.0%; Cl, 11.2%.

This compound was changed by reaction with sodium carbonate in hot ethanol to the corresponding sodium salt, having a melting point of more than 350° C. The product was white, soluble in hot alcohol and slightly soluble in hot water.

D. PREPARATION OF 4-(3'-ACETOXY-4'-CARBOXY-PHENYLAMINO-7-CHLOROQUINOLINE

Acetylation of 4-(3'-hydroxy-4'-carboxy-phenylamino)-7-chloroquinoline, effected according to the procedure of Example IB, furnished successively the sulfate and then the free base of 4-(3'-acetoxy-4'-carboxy-phenylamino)-7-chloroquinoline.

This last compound melting at 260–270° C. with decomposition occurred in the form of pale yellow prisms, slightly soluble in acetone and alcohol, insoluble in benzene, ether, chloroform and water.

*Analysis.*—$C_{18}H_{13}O_4N_2Cl$: Molecular weight=356.76. Calculated: C, 60.60%; H, 3.67%; N, 7.85%; Cl, 9.94%. Found: C, 60.3%; H, 3.6%; N, 8.0%; Cl, 9.7%.

This compound is not described in the literature.

EXAMPLE II

*Preparation of 4-(4'-Carbomethoxy-Phenylamino)-7-Chloroquinoline*

In a similar manner, by condensing according to the operatory method of Example I, 4,7-dichloroquinoline was condensed with methyl p-aminobenzoate and 4-(4'-carbomethoxy-phenylamino)-7-chloroquinoline was obtained having a melting point of 170° C.

*Analysis.*—$C_{17}H_{13}O_2ClN_2$: Molecular weight=312.7. Calculated: C, 65.29%; H, 4.18%; N, 8.96%; Cl, 11.33%. Found: C, 65.4%; H, 4.3%; N, 9.0%; Cl, 11.5%.

The product occurred in the form of white needles, soluble in benzene and chloroform, less soluble in alcohol, ether and acetone and insoluble in water.

The hydrochloride of this product melted at 270–275° C. It was slightly soluble in alcohol.

These compounds are not described in the literature.

Various modification of the process and the products of the invention may be made without departing from the spirit or scope thereof and it is to be understood that the invention is to be limited only as defined in the appended claims.

We claim:
1. 4-(3'-hydroxy-4'-carbomethoxy-phenylamino)-7-chloroquinoline.
2. The nontoxic pharmaceutically acceptable acid addition salts of 4-(3'-hydroxy-4'-carbomethoxy-phenylamino)-7-chloroquinoline.
3. 4-(3'-hydroxy-4'-carboxy-phenylamino)-7-chloroquinoline.
4. The sodium salt of 4-(3'-hydroxy-4'-carboxy-phenylamino)-7-chloroquinoline.
5. 4-(3'-acetoxy-4'-carbomethoxy-phenylamino)-7-chloroquinoline.
6. The nontoxic pharmaceutically acceptable acid addition salts of 4-(3'-acetoxy-4'-carbomethoxy-phenylamino)-7-chloroquinoline.
7. 4-(3'-acetoxy-4'-carboxy-phenylamino)-7-chloroquinoline.
8. The nontoxic pharmaceutically acceptable acid addition salts of 4-(3'-acetoxy-4'-carboxy-phenylamino)-7-chloroquinoline.

References Cited in the file of this patent

UNITED STATES PATENTS

| | | |
|---|---|---|
| 2,419,199 | Burckhalter et al. | Apr. 22, 1947 |
| 2,474,822 | Burckhalter et al. | July 5, 1949 |

OTHER REFERENCES

Greenhalgh et la.: British J. Pharmacol., vol. 11, pages 220–4 (1956), page 223.

Burger: Medicinal Chemistry, 2nd edition, 1960, pages 345–352.